United States Patent [19]

Bauer et al.

[11] Patent Number: 4,587,106
[45] Date of Patent: May 6, 1986

[54] LIQUID-LIQUID EXTRACTION WITH THE AID OF MICROEMULSIONS OF SUBSTANCES DISSOLVED IN WATER

[75] Inventors: Denise Bauer, Le Raincy; Jacques Komornicki, Lescar; Jacques Tellier, Billere, all of France

[73] Assignee: Societe Nationale Elf Aquitaine, France

[21] Appl. No.: 452,708

[22] Filed: Dec. 23, 1982

[30] Foreign Application Priority Data

Dec. 28, 1981 [FR] France .................. 81 24267

[51] Int. Cl.⁴ .................. B01D 11/00; B01D 17/02
[52] U.S. Cl. .................. 423/8; 210/634; 210/643; 423/22; 423/24; 423/89; 423/112; 423/139
[58] Field of Search .................. 210/638, 642, 643, 634; 423/8–10, 22, 24, 89, 112, 139

[56] References Cited

U.S. PATENT DOCUMENTS

| | | | |
|---|---|---|---|
| 3,389,078 | 6/1968 | Elzinga et al. | 210/643 X |
| 3,696,028 | 10/1972 | Li et al. | 210/643 X |
| 3,779,907 | 12/1973 | Li et al. | 210/638 |
| 4,086,163 | 4/1978 | Cahn et al. | 210/638 |
| 4,292,181 | 9/1981 | Li et al. | 210/643 X |
| 4,337,225 | 6/1982 | Dines | 423/10 |

Primary Examiner—Richard V. Fisher
Assistant Examiner—W. Gary Jones
Attorney, Agent, or Firm—Ostrolenk, Faber, Gerb & Soffen

[57] ABSTRACT

Liquid-liquid extraction of a substance from an aqueous solution thereof, which consists in preparing a microemulsion of this solution with a hydrophobic liquid in such a way that the layer of microemulsion is accompanied by a layer of consumed aqueous solution and a layer of hydrophobic liquid containing the substance to be extracted.

16 Claims, 1 Drawing Figure

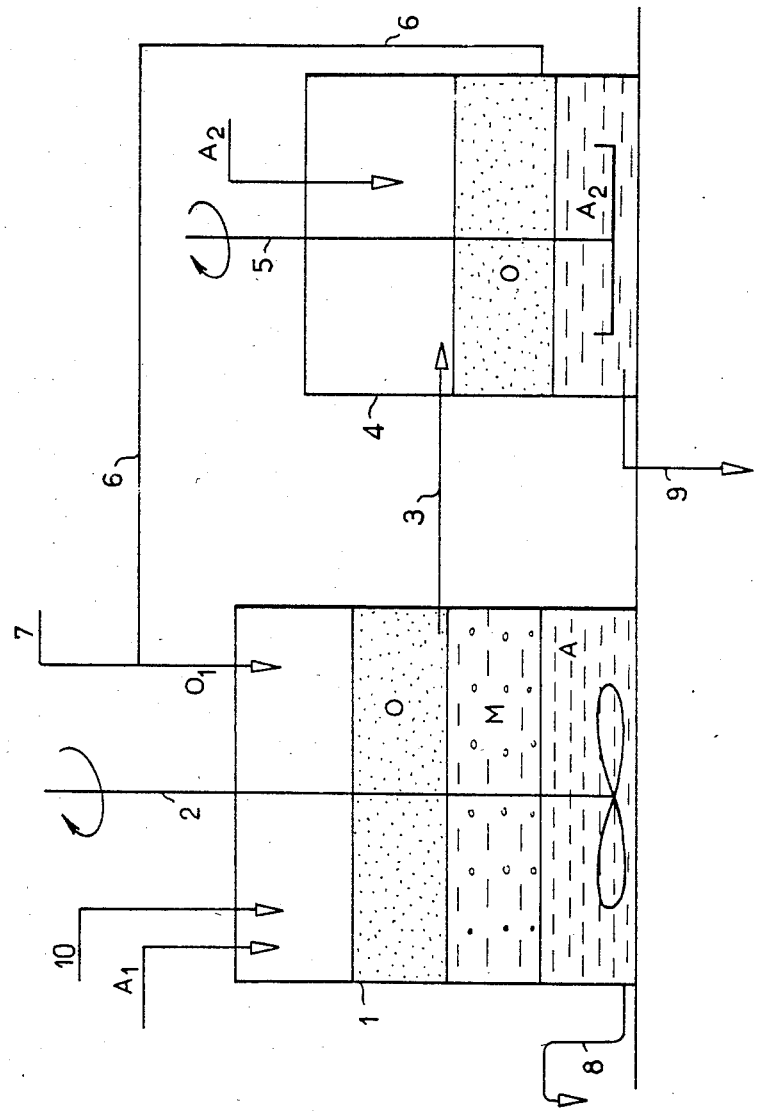

LIQUID-LIQUID EXTRACTION WITH THE AID OF MICROEMULSIONS OF SUBSTANCES DISSOLVED IN WATER

The invention relates to the extraction of various substances from their aqueous solutions by means of hydrophobic solvents. It relates more particularly to the extraction of cations from their acid solutions with the intervention of third compounds, notably chelating agents.

Liquid-liquid extraction is well-known in a general manner and, in particular, in its applications in the extraction of metals, particularly the less common metals, from aqueous solutions where these cations are present in low concentration. This known technique consists in agitating the aqueous solution with a hydrophobic liquid known as a diluent, most frequently a hydrocarbon, holding in solution a compound capable of giving with the cation to be extracted a complex which is soluble in the hydrophobic liquid; the liquid immiscible with water is then separated and the complex of the cation desired is recovered by re-extraction by means of an aqueous acid or alkaline solution. The hydrophobic liquids or "diluents" usually employed are hydrocarbons, if required halogenated, for example dodecane, kerosene, benzene, solvent naphtha, chloroform, carbon tetrachloride etc. As regards "extractants", that is the compounds intended to form a liposoluble combination with the desired cation, they are generally selected at the present time from organo-phosphorus derivatives, derivatives of 8-hydroxyquinoline, derivatives of alpha or beta hydroxyoximes, fatty amines and their salts.

The method of liquid-liquid extraction involves lengthy operations, however, which constitutes a defect from the industrial standpoint; in fact, the extraction, that is transfer of the substance to be extracted from the aqueous medium into the hydrophobic phase, often requires a prohibitive time; in certain cases, this time can even attain several hours. In order to offset this disadvantage, it has recently been proposed to effect the extraction with the hydrophobic liquid, first producing a microemulsion of this liquid in equilibrium with the aqueous phase which had contained the elements to be extracted. This solution gives a considerable acceleration of the extraction, to the point where it can last only a few minutes in cases where one or several hours are required by the standard method. Working with microemulsions is thus of considerable interest; however, it has certain material disadvantages. In particular, recovery of the extracted element, that is re-extraction of this element from the microemulsion, is often difficult. Firstly, decantation of the hydrophobic phase, after the addition of appropriate reactants, is quite lengthy; also, appreciable quantities of the aqueous solution remain dispersed in the hydrophobic phase, which adversely affects the purity of the extracted element. It is also to be noted that the surfactant and its co-surfactant, necessary for obtaining the microemulsion, are partially lost by reason of their transfer into the aqueous phase during the course of the re-extraction.

The present invention remedies both the disadvantages of the standard method and those of extraction by microemulsion (WII). It is based on the fact that it is generally possible to produce a microemulsion accompanied by two distinct phases, hydrophobic and aqueous, and that the separation of the phase of interest is rapid, while loss of the surfactant is avoided.

The invention applies advantageously to hydrometallurgy, where it is particularly useful for metals whose liquid/liquid extraction by the standard method is slow, but for which known extractants are suitable, such as alpha and beta-hydroximes, organo-phosphorus compounds or hydroxyquinolines. The new process can be employed for the separation of various metals of Groups II to VIII of the Periodic Classification of the Elements, particularly Pt, Pd, Rh, U, Ni, Fe, Al, Cu, Ge and others.

The new process according to the invention, which consists in effecting liquid-liquid extraction by the creation of a microemulsion between the aqueous solution and the hydrophobic liquid, is characterised in that the conditions of formation of this microemulsion are regulated in such a way as to obtain a three phase-system, namely a hydrophobic phase and an aqueous phase and, between them, an intermediate phase constituted by a microemulsion of the aqueous solution with the hydrophobic liquid.

As the hydrophobic liquid is practically always constituted by an organic substance, particularly an aliphatic or aromatic hydrocarbon, which can be halogenated, containing in solution the lipo-soluble substances (extractant, modifier), it is referred to, in the following part of the present description, as the organic phase.

According to the classification proposed by P. A. WINSOR (Trans. Faraday Soc. (1948) 44, 376), the type of system utilized according to the invention is designated in the art as Winsor III.

The principal advantage of the process of the invention is that the median phase, which is a microemulsion, retains substantially all the surfactant employed and it can be re-utilized for a new extraction. Thus, the invention provides economy in surfactants.

Also, the organic phase retains extremely little of the aqueous solution, which is of advantage as regards purity of the element which is recovered in this phase.

It is to be noted that the separation into three layers in the process of the invention is more rapid than in two-phase systems. On the other hand, re-extraction of the desired element from the organic layer, by treatment with an aqueous solution, is easy and comprises rapid decantation due to the absence of the surfactant from this organic phase.

The new process can be carried out with various materials which have been employed already in the prior technique concerned with liquid-liquid extractions. Thus, as the diluents, for example, various hydrocarbons already mentioned above can be employed, which are aliphatic or aromatic and if required halogenated, particularly the solvents usually used known in commerce under the names Kerosene, Solvesso, Escaid, Ketrul and Kerdane, derived from petroleum cuts, selected for their low cost and their high flash point.

The diluent can contain a "modifier" such as a long-chain alcohol. In a standard process of liquid-liquid extraction, the modifier serves to improve separation of the phases at the time of decantation. In the case of a tri-phase system comprising a microemulsion, the co-surfactant is often an alcohol which replaces the modifier.

Moreover, as regards compounds capable of giving a soluble combination in the organic liquid, in particular chelating extractants, the known technique affords a very wide choice; depending upon the nature of the mineral substance to be extracted and the extraction medium, the compound can be selected which is most suitable for each case. For example, various phosphoric or thiophosphoric esters can be used, particularly the di-(2-ethylhexyl), heptadecyl, dodecyl, di-(1-methylheptyl), di-isoctyl, di-(2-ethyl-4-methyl-pentyl), di-(2-propyl-4-methylpentyl), octyl and phenyl hydrogenophosphates and the di-(diisobutyl-methyl) and di-(2-ethylhexyl)dithiophosphate acids.

Other extractants, often employed at present, are derivatives of quinoline, particularly 8-hydroxy-quinoline; these in particular are derivatives carrying an aliphatic chain in the 7-position, that is ortho to the —OH group; these chains generally have up to 12 carbon atoms and can comprise a double bond, as is the case with 7-(3-nonyl-1-propenyl)-8-hydroxy-quinoline ("Kelex 100"). Various oximes are also employable, for example 1-(4-alkyl-phenyl)-propane-1,2-dione dioxime or the corresponding dioxime of the nonane dione, a 2-(4-alkyl-phenyl)-2-hydroxy-imino-acetaldehyde oxime, the alkyl groups generally having 6 to 18 carbon atoms.

While the formation of a microemulsion requires the presence of a surfactant and a co-surfactant, which is most frequently an alcohol, the process according to the invention naturally comprises the addition of such substances which are introduced in current practice into the organic liquid serving for the extraction together with the extractant.

The various surfactants capable of serving for the preparation of a microemulsion are known, as well as the various co-surfactants. However, for carrying out the invention, it is suitable to take care to choose the two kinds of agents and their proportions in an appropriate manner so as to obtain a Winsor III system comprising the three phases, as explained above. This choice will be clear to a person skilled in the art.

The surfactant is also selected so that it does not oppose the process of formation of a lipo-soluble complex between the cation or cations to be extracted and the extractant.

As regards the nature of the surfactants, which can be anionic and/or nonionic and preferably are characterised by a hydrophilic-lipophilic balance greater than 9, mention can be made by way of non-limitative examples of the following types of compounds: hydrocarbon sulphonates, alkyl or alkylaryl alkali metal sulphonates, phosphoric esters of ethoxylated fatty alcohols, sulphosuccinates, ethoxylated alkyl phenols, particularly having more than 3 ethylene oxide groups, polyethoxylated polyalcohols, alkyl ethers of sugars, such as for example the decyl ether of glucose, sorbitan alcohols or polyethoxylated esters of the latter, and mono or dialkanolamides, particularly those of vegetable oils, such as the mono and diethanolamides of coprah.

By way of non-limitative example, mention is made below of the co-surfactants usually used in industry. Primary, secondary or tertiary alcohols containing $C_3$ to $C_{16}$ with a straight or branched chain, alkyl glycols with a hydrocarbon chain comprising 3 to 16 carbon atoms, the chain being either straight or branched, primary, secondary or tertiary amines, alkyl groups carrying the group $PO_3$. Lipophilic compounds comprising a polar group are also suitable, in a general manner.

The proportions of the surfactants and co-surfactants to be utilized depend both on the nature of each of them and on that of the organic liquid and the components of the aqueous solution present; these proportions thus cannot be indicated a priori. It can be stated, however, with a certain approximation that, for the most effective surfactants, the concentration of these agents is of the order of 0.025 to 0.40 mole/liter of organic liquid and preferably from 0.05 to 0.25; as regards the concentration of alcohols, they will be about 0.1 to 3 and preferably 0.3 to 0.9 mole/liter of organic liquid. In any case, the surfactant should be at a concentration higher than its critical micellar concentration (cmc) in water.

The process of the invention is suitable for all general applications of the known method of liquid-liquid extraction. While the examples given below relate only to the extraction of cations, the process applies to the extraction of all kinds of mineral or organic substances present in aqueous solution, which are susceptible of being combined into a lipo-soluble form. It thus can be employed for the extraction of organic compounds, for example pharmaceutical or natural substances, when it is possible to put them into solution in a hydrophobic liquid.

As mentioned above, an important advantage of the invention, apart from the acceleration of the speed which remains the fundamental property, lies in the possibility of recycling the intermediate micro-emulsified phase, for thus re-utilizing substantially all of the surfactant present. The operations of the process can be realized in the standard manner either discontinuously or continuously, particularly in decantation vessels or in columns, as is well known in the art. In order to define the circumstances for carrying out the process, the accompanying drawing shows very diagrammatically an apparatus according to this principle and its discontinuous operation is described below.

The drawing FIGURE is a schematic representation of the process.

In the drawing, 1 represents a decantation vessel provided with an agitator 2. $A_1$ represents the input of the aqueous solution to be treated, while the organic liquid is introduced at $O_1$.

After the introduction of the desired volumes of liquid through $A_1$ and through $O_1$, the mixture is subjected to rapid agitation by means of the agitator 2, which is then stopped when three distinct layers appear in the vessel 1.

The drawing shows the three superposed layers, A, M, O, which are formed during the rest period of several minutes after agitation.

The layer A is constituted by an initial aqueous solution from which the desired element has been extracted, in particular a cation; it is removed via the duct 8. The latter is represented diagrammatically, but it will be understood that in practice the mounting is such that only the layer 8 can be evacuated from the bottom.

The organic phase O which has absorbed the major part of the element to be extracted is passed through 3 into a second vessel 4 where recovery of this element will take place. This re-extraction is effected by agitation by means of the agitator 5 of an aqueous solution $A_2$, having a pH different from that of A, with the liquid O. After this operation, the solution $A_2$ contains the desired element and it is taken out through an outlet 9 for subsequent treatments which do not form part of the invention. The organic layer O thus deprived of the element in question is recovered through the outlet 6 to return to the vessel 1, where it rejoins the intermediate layer M which has remained intact. In order to compensate for losses of the organic liquid O which are caused in an industrial operation, fresh liquid O is introduced via 7.

By an inlet 10, small quantities of surfactant, co-surfactant and if required extractant compounds are introduced which have been lost during the course of the evacuation of A through 8 and of $A_2$ through 9.

Then via A a new portion of the solution to be treated is introduced. It is then sufficient to agitate rapidly the contents of the vessel 1, thus recommencing a new operative cycle identical with the foregoing.

Maintenance in the vessel of the intermediate microemulsified layer M, which amounts to the recycling of this microemulsion, provides—as is desired—a substantial saving in surfactants.

The invention is illustrated non-limitatively by the examples which follow.

EXAMPLE 1

Extraction of the Ferric Cation From Its Dilute Sulphuric Solution

In the decantation vessel 1 described above, there is introduced 1 liter of kerosene and 41.8 g, namely 0.2 mole, of bis(2-ethyl-hexyl) acid phosphate and then 50 g of sodium lauryl sulphate=0.174 mole and 229 g of n-pentanol, namely 280 ml=2.6 moles are added. 1 liter of aqueous solution of the following composition is then added:

0.558 g of $Fe^{+++}$, or 0.01M
14.2 g of $Na_2SO_4$=0.1M
9.8 g of $H_2SO_4$=0.1M

The contents are then agitated for 2 minutes, after which they are allowed to stand. After about 5 minutes, it will be seen that the contents of the vessel have clearly separated into the 3 layers O, M and A as shown in the drawing and there were found, for each of them:

TABLE I

|  | Layers | | |
|---|---|---|---|
|  | O | M | A |
| Volume (ml) | 990 | 460 | 850 |
| % of total volume | 43 | 20 | 37 |
| % of initial quantities used: | | | |
| Fe | 84 | 16 | 0 |
| Lauryl-sulphate | 0.5 | 99 | 0.5 |
| Pentanol | 72 | 28 | 0 |
| bis(Et.-2 Hex) Phosphate | 82 | 18 | 0 |
| Kerosene | 82 | 18 | 0 |
| Aqueous solution | 0 | 15 | 85 |

The aqueous lower layer A was evacuated, the organic phase O was then introduced into the recovery vessel 4 as described above, while the intermediate layer M was allowed to remain in the first apparatus 1.

To 990 ml of liquid O in the second bath (4), there was added a third of its volume, namely 330 ml of an aqueous 2N sulphuric acid solution. After rapid agitation, this was allowed to stand and in 4 minutes a clear separation into two layers was obtained: the lower, $A_2$, contained all the iron thus recovered in the sulphuric solution.

The kerosene, O, supernatant in the bath 4, was then re-transferred to the decanter 1 with a small addition of 20 ml of fresh kerosene containing 0.2 mole per liter of extractant, namely the 20% of n-pentanol lost during the operation. In this manner, the volume of 990 ml of the phase O of Table I given above was again present in the principal extractor 1.

There was then introduced, into the latter, 850 ml (volume of the Table) of ferric aqueous solution A, of the composition indicated above.

Via the inlet 10, the additives were introduced (phosphate, lauryl sulphate, pentanol) in order to reestablish exactly their initial concentrations, taking into account the results of Table I above.

Extraction and recovery were carried out in the same manner as given above. In this second operation, utilizing the recycled phase M of the first, in the new phase 0.99% of the $Fe^{+++}$ introduced with the solution A was present. The same applies with subsequent operations, re-utilizing each time the layer M of the preceding operation.

EXAMPLES 2 TO 4

Extractions with microemulsion, in a 3-phase system as in Example I, were effected with solutions containing the same concentrations in $Fe^{+++}$ or $Al^{+++}$ ions, with various surfactants, the co-surfactant being the same, namely n-pentanol.

The organic liquid was always kerosene containing 41.8 g (0.2 mole) of bis(2-ethylhexyl)phosphate per liter. The Table below summarises the results obtained, the extraction times being given in minutes.

The last horizontal line indicates the time necessary for complete extraction in similar tests effected without the surfactant or pentanol, namely without formation of the microemulsion.

By way of comparison, in the Table, the results of Example 1, described in detail above, are repeated.

TABLE II

| Example No | 1 | 2 | 3 | 4 |
|---|---|---|---|---|
| Cation | Fe | Fe | Fe | Al |
| Sodium lauryl sulphate | 5% | — | — | 5% |
| Hexa-ethoxylated nonyl-phenol ("Simulosol 630") | — | 5% | — | — |
| Decyl-ether of glucose ("Triton BG 10") | — | — | 5% | — |
| Pentanol % | 28 | 8 | 18 | 28 |
| Duration of extraction in min | 2 | 10 | 5 | 1 |
| Duration of extraction in min in a test without surfactant | 30 | 30 | 30 | 120 |

It can be seen that the advantage, confirmed in Example 1, is given with the two other surfactants (Simulsol and Triton). It will be noted in these Examples, as in Example 1, that the surfactants are found mainly in the re-utilized median phase M.

EXAMPLE 5

The process according to the invention was applied to the extraction of nickel from a 0.4N sulphuric solution containing 0.01 Ni atom per liter.

The extractant utilized was di(diisobutylmethyl)-dithiophosphoric acid present in the amount of 90.5 g or 0.25 mole per liter of kerosene.

The surfactant is hexa-ethoxylated nonyl-phenol (Simulsol 630) in a concentration of 40 g/l of kerosene or 0.0826 mole/liter.

The co-surfactant is 1-hexanol, viz. 170 g/l of kerosene or 1.67 mole/liter.

1 liter of kerosene is employed per 1 liter of nickel sulphuric solution.

The three-phase operation as in the foregoing examples produced an extraction of 99.3% of nickel present in 30 seconds. The separation time of the phases was 8 minutes. The organic phase contained only 1.5 g of water/liter, which produced an excellent selectivity for nickel. The intermediate microemulsion phase contained 450 g of aqueous solution per liter. An operation with the same extractant and kerosene without a surfactant or co-surfactant required four times as much time.

EXAMPLES 6 TO 10

Extractions similar to those of Examples 2 to 4 were effected with aqueous solutions of the same ionic composition as that of Example 1, the cations to be extracted being successively Ge, Fe and Ni; the extractant here was 7-(3-nonyl-1-propenyl)-8-hydroxy-quinoline (Kelex 100):

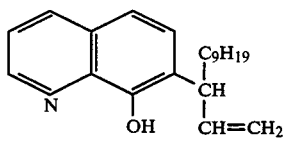

employed in the amount of 0.2 or 0.05 mole per liter of kerosene or 62 or 15.5 g/l.

The nature and percentage amounts of the surfactant and co-surfactant are indicated in Table III below, with the times of extraction of the cation concerned; the percentages are given by weight of the organic phase.

TABLE III

| Examples | 6 | 7 | 8 | 9 | 10 |
|---|---|---|---|---|---|
| Cation | Ge | Ge | Fe | Ni | Ni |
| Sodium dodecyl benzene sulphonate | 5 | — | — | — | — |
| Hexa-ethoxylated nonyl-phenol (Simulsol 630) | — | — | 5 | — | 5 |
| Decyl-ether of glucose (Triton BG 10) | — | 5 | — | 5 | — |
| n-butanol | 12 | — | — | — | — |
| n-pentanol | — | 12 | 16 | — | 14 |
| n-hexanol | — | — | — | 16 | — |
| "Kelex 100" g/l | 62 | 62 | 15.5 | 62 | 62 |
| Duration of extraction in min. | 2 | 2 | 27 | 10 | 20 |
| Duration of extraction in min. in a test without surfactant | 240 | 30 | 240 | 30 | 240 |

It can be seen that replacement of the phosphoric extractant of Examples 1 to 5 with a substituted quinoline also gives very good results, the extraction time being reduced frequently to a tenth of that required by the standard method without microemulsion.

On the other hand, as in Example 1, it can be seen that the major part of the additives are recoverable with the median phase M of the process.

We claim:

1. Process of liquid-liquid extraction of a substance from an aqueous solution comprising the steps of
   (a) contacting the aqueous solution, a hydrophobic liqud, an extractant compound capable of forming with the substance to be extracted a combination soluble in the hydrophobic liquid, a surfactant and a co-surfactant so as to form a product having three distinct layers, said layers being the aqueous solution, the hydrophobic liquid and a layer of a microemulsion between the layers of the aqueous solution and hydrophobic liquid;
   (b) separating the aqueous layer;
   (c) separating the hydrophobic layer and recovering the substance desired therefrom;
   (d) combining the microemulsion layer with additional hydrophobic liquid, extractant, surfactant and co-surfactant of the amount lost during the steps separating the aqueous liquid and hydrophobic liquid from the three-layer product;
   (e) contacting a new quantity of aqueous solution containing the substance to be extracted with the microemulsion-hydrophobic liquid combination so as to form a new three-layer product;
   (f) separating the aqueous layer from the new three-layer product; and
   (g) separating the hydrophobic liquid from the microemulsion and recovering the substance desired therefrom.

2. Process according to claim 1 in which steps (d)–(g) are repeated at least once.

3. Process according to claim 1 in which the hydrophobic liquid employed in step (d) comprises the hydrophobic liquid separated in step (c) after recovery of the substanced desired therefrom.

4. Process according to claim 1, in which the hydrophobic liquid is an aliphatic or aromatic hydrocarbon or a mixture thereof, containing in solution an extractant compound and the co-surfactant.

5. Process according to claim 1, in which the extractant is an organo-phosphorus compound, a derivative of 8-hydroxy-quinoline or a hydroxy-oxime.

6. Process according to claim 1, in which the surfactant is anionic or nonionic.

7. Process according to claim 6 in which the surfactant is selected from the group consisting of an alkyl aryl sulphonate, an ethoxylated phenol, an ethoxylated alkyl phenol, a polyethoxylated polyalcohol and an alkyl ether of a carbohydrate.

8. Process according to claim 1, in which the co-surfactant is a $C_3$ to $C_{16}$ alcohol.

9. Process according to claim 8 in which the concentration of the surfactant is 0.025 to 0.4 mole/liter of hydrophobic liquid and of alcohol is 0.1 to 3 moles per liter of hydrophobic liquid.

10. Process according to claim 9 in which the substance is a metal of Groups II to VIII of the Periodic Classification of the Elements.

11. Process according to claim 10 in which the metal is selected from the group consisting of Pt, Pd, Rh, U, Ni, Fe, Al, Ge, and Cu.

12. Process according to claim 9 in which the concentration of the surfactant is 0.05 to 0.25 mole/liter of hydrophobic liquid and the concentration of alcohol is 0.3 to 0.9 mole/liter of hydrophobic liquid.

13. Process according to claim 1 in which the surfactant is selected from the group consisting of sodium lauryl sulfate, hexa-ethoxylated nonyl phenol, decyl ether of glucose and sodium dodecyl benzene sulfonate, and the co-surfactant is selected from the group consisting of butanol, pentanol and hexanol.

14. Process according to claim 13 in which the extractant is bis(2-ethyl-hexyl) acid phosphate di(-diisobutylmethyl)-di-thiophosphic acid or 7-(3-nonyl-1-propenyl)-8-hydroxy quinoline.

15. Process according to claim 14 in which the hydrophobic liquid is kerosene and the substance is selected from the group consisting of Fe, Al, Ni and Ge.

16. Process according to claim 15 in which the concentration of surfactant is 0.025 to 0.4 mole/liter of kerosene and the concentration of alcohol is 0.1 to 3 mole/liter of kerosene.

* * * * *